United States Patent Office 2,790,799
Patented Apr. 30, 1957

2,790,799

CYCLOPENTANOPHENANTHRENE DERIVATIVES AND PROCESS FOR THE PRODUCTION THEREOF

Carl Djerassi, Birmingham, Mich., and Franz Sondheimer and George Rosenkranz, Mexico City, Mexico, assignors to Syntex S. A., Mexico City, Mexico, a corporation of Mexico No Drawing. Application November 27, 1953, Serial No. 394,904

Claims priority, application Mexico November 27, 1952

5 Claims. (Cl. 260—239.55)

The present invention relates to novel cyclopentanophenanthrene derivatives and to a method for the preparation thereof. More particularly the present invention relates to the production of 22a-spirostan-3α-ol-11-one as well as the preparation of certain novel intermediates for the production of this compound.

22a-spirostan-3α-ol-11-one is an extremely important intermediate for the preparation of cortical hormones such as cortisone from compounds of the sapogenin series, since in addition to having the 11-keto group characterizing cortisone, it also possesses the normal configuration at C-5. Degradation of this compound then, as pointed out hereinafter produces the normal pregnan-3α-ol-11,20-dione, a known intermediate for the production of cortisone (J. A. C. S. 74, 483 (1952)).

In accordance with the present invention, it has been discovered that $\Delta^{7,9(11)}$-22a-spirostadien-3-one, which may be prepared in accordance with the United States application of Rosenkranz and Djerassi, Serial No. 219,532, filed April 5, 1951, now abandoned, may be readily converted to various intermediates and finally to 22a-spirostan-3α-ol-11-one and/or esters thereof.

A portion of the process of the present invention may be exemplified by the following equation:

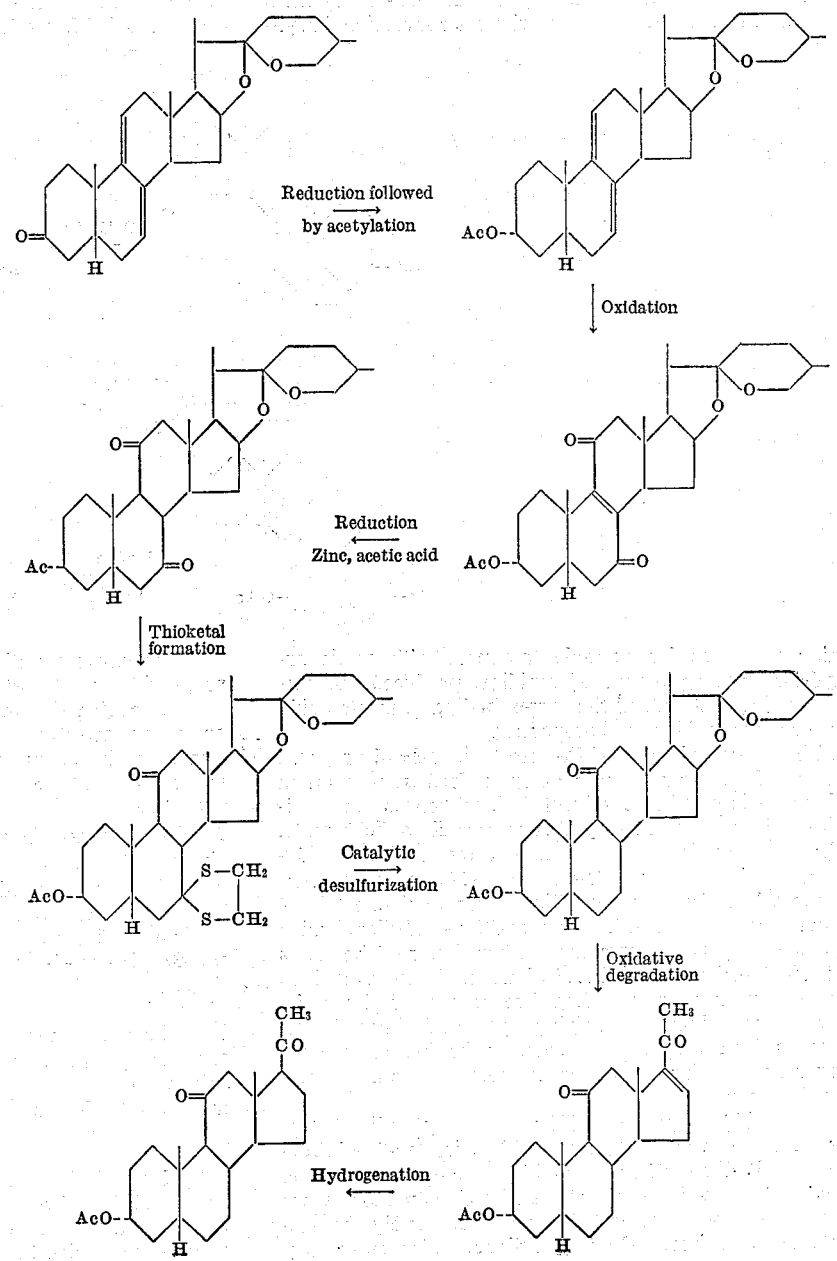

In the above equation Ac represents the acetyl group, however, it may be pointed out that although the process has been carried forward with a 3-acetoxy compound, other esters especially the lower fatty acid esters or benzoic acid esters of the compounds exemplified in the above equation, may be utilized for the various steps. It may be further noted as will be hereinafter pointed out in detail that the greater part of the various steps above-outlined may also be carried out with the 3 alcohols.

In practicing the process outlined in the foregoing equation, $\Delta^{7,9(11)}$-22a-spirostadien-3-one is dissolved in a suitable solvent, such as anhydrous tetrahydrofuran and is then added to a solution of lithium aluminum hydride in a similar solvent. The mixture is refluxed for a short period of time, as for example one hour, and then cooled in ice. Thereafter the excess reagent is destroyed by the addition of water and the product suitably purified to yield the corresponding $\Delta^{7,9(11)}$-22a-spirostadien-3α-ol. Although lithium aluminum hydride is the preferred reducing agent for this reaction it may be understood that other well-known reducing agents capable of reducing steroid ketones to the corresponding steriod alcohols may be utilized for this step. The corresponding acetate or other ester of the $\Delta^{7,9(11)}$-22a-spirostadien-3α-ol was then prepared by suitable treatment with the conventional acylating agent, as for example treatment with acetic anhydride in the presence of pyridine, produced the corresponding acetate, and the corresponding benzoate could also be prepared in a similar manner.

The 3-ester of $\Delta^{7,9(11)}$-22a-spirostadiene-3α-ol prepared in accordance with the previously set forth step was then dissolved in a suitable solvent such as benzene and oxidized with an oxidizing agent such as sodium dichromate. Two compounds were prepared as a result of this oxidation, i. e. the ester or acetate of $\Delta^{9(11)}$-22a-spirosten-3α-ol-7-one, which could be crystallized from a suitable solvent and the acetate of $\Delta^8$-22a-spirosten-3α-ol-7,11-dione which could be separated from the mother liquor. The esters of $\Delta^8$-22a-spirosten-3α-ol-7,11-dione could be saponified to prepare the corresponding free compounds by utilizing a conventional saponifying agent and either the esters, as for example the acetate, or the free compounds could be used for the subsequent steps of the above-outlined process.

The oxidation product of the previously outlined step, as for example the acetate of $\Delta^8$-22a-spirosten-3α-ol-7,11-dione was dissolved in a suitable solvent such as acetic acid and reduced as for example with zinc dust to prepare the corresponding saturated compound, namely the acetate of 22a-spirostan-3α-ol-7,11-dione. This dione may then be treated with an agent capable of selectively removing the 7-keto group. Thus, the dione may be subjected to Wolff-Kischner reduction especially as set forth by Huang Minlon in United States Patent No. 2,471,697, or as indicated in the above equation, the 7-thioketal may be produced selectively by reaction of the dione with ethanedithiol and the resultant thioketal catalytically desulfurized. In any event the resultant compound is the corresponding acetate of 22a-spirostan-3α-ol-11-one, or if the free compound has been utilized for the foregoing steps as previously set forth the resultant compound is the free alcohol.

Either the free compound of the acetate of 22a-spirostan-3α-ol-11-one may then be subjected to oxidative degradation as for example by heating this compound in a pressure bomb with acetic anhydride, followed by oxidation of the product with chromic acid. Suitable purification of the resultant product then gave, in either case, the acetate of $\Delta^{16}$-pregnen-3α-ol-11,20-dione. As indicated, catalytic hydrogenation of the $\Delta^{16}$ compound then produces the known acetate of 11-keto pregnanolone, i. e. pregnan-3α-ol-11,20-dione.

The following equation illustrates a further treatment of the product of the first oxidation step, namely the acetate of $\Delta^{9(11)}$-22a-spirosten-3α-ol-7-one:

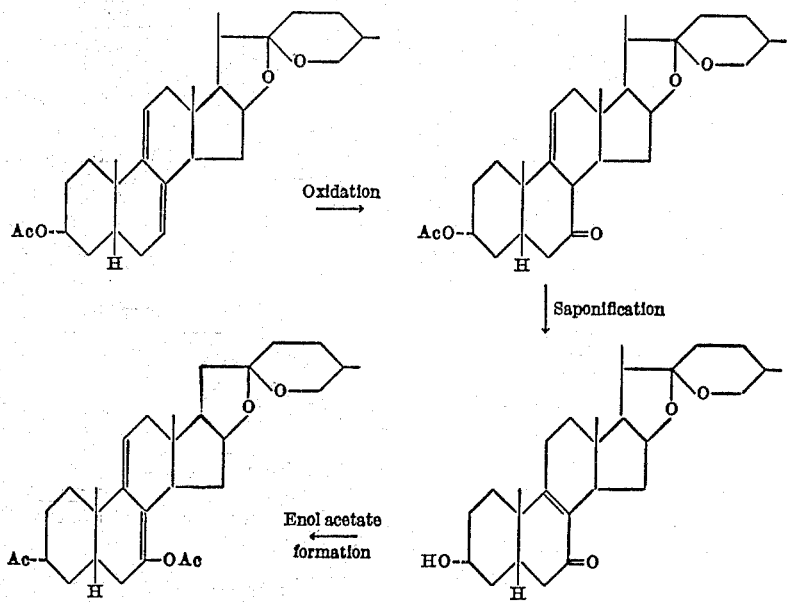

In the above equation Ac represents the acetyl group as previously set forth.

In practicing the processes above-outlined, the acetate or other ester of $\Delta^{9(11)}$-22a-spirosten-3α-ol-7-one is treated with potassium hydroxide to produce $\Delta^8$-22a-spirosten-3α-ol-7-one. This compound is then treated with isopropenyl acetate to prepare the corresponding $\Delta^{7,9(11)}$-22a-spirostadiene-3α,7-diol as set forth in the above equation. This last compound may also be utilized as an intermediate since the diacetate of $\Delta^{7,9(11)}$-22a-spirostadiene-3α,7-diol upon treatment with an aromatic peracid, such as perbenzoic acid, gives $\Delta^8$-22a-spirosten-3α,11α-diol-7-one 3-monoacetate. The monoacetate thus produced upon oxidation with chromic acid or sodium dichromate then gives the $\Delta^8$-22a-spirosten-3α-ol-7,11-dione 3-monoacetate, which is identical with the same compound previously referred to.

The following specific examples serve to illustrate but are not intended to limit the present invention:

*Example 1*

Under anhydrous conditions, a solution of 2 g. of $\Delta^{7,9(11)}$-22a-isospirostadiene-3-one in 50 cc. of anhydrous tetrahydrofuran was added to a solution of 1 g. of lithium aluminum hydride in 20 cc. of tetrahydrofuran and the mixture was refluxed for one hour and cooled in ice. The excess reagent was destroyed by the careful addition of water, the mixture was acidified with sulfuric acid and the tetrahydrofuran was distilled. The precipitate formed was collected and washed with water until neutral. Recrystallization from chloroform-methanol yielded 1.84 g. of $\Delta^{7,9(11)}$-22a-spirostadiene-3α-ol having a melting point of 209°–212° C., $[\alpha]_D$ +20° (chloroform).

The acetate of the above compound was prepared by conventional acetylation procedure (acetic anhydride-pyridine) and had a melting point of 150°–153° C., $[\alpha]_D$ +44° (chloroform).

The benzoate was also conventionally prepared. It had a melting point of 198°–200° C., $[\alpha]_D$ +57° (chloroform).

Example II

A solution of 17.5 g. of sodium dichromate dihydrate in 150 cc. of acetic acid was added dropwise to a stirred solution of 10 g. of the acetate of $\Delta^{7,9(11)}$-22a-spirostadiene-3α-ol in 150 cc. of benzene maintaining the temperature at 15° C. After standing overnight at room temperature, the mixture was poured into water and extracted with ether. The ether solution was washed with water, with sodium carbonate solution and water until neutral, dried and evaporated to dryness. The residual oil was chromatographed in a column with 500 g. of washed alumina. The fractions having an ultraviolet absorption maximum at 272 mμ were combined. Crystallization from chloroform-methanol yielded first the acetate of $\Delta^{9(11)}$-22a-spirosten-3α-ol-7-one having a melting point of 220°–222° C., $[\alpha]_D$ −60° (chloroform).

From the mother liquors of this little soluble substance, the acetate of $\Delta^8$-22a-spirosten-3α-ol-7,11-dione was obtained, having a melting point of 146°–148° C., $[\alpha]_D$ −17° (chloroform), ultraviolet absorption maximum at 272 mμ, log E 4.04. The infrared spectrum of this substance exhibits the characteristic bands at 1736 and 1674 cm.$^{-1}$, showing the presence of an acetyl and an unsaturated keto group. Conventional saponification produced the corresponding free $\Delta^8$-22a-spirosten-3α-ol-7,11-dione.

Example III

A solution of 5 g. of the acetate of $\Delta^8$-22a-spirosten-3α-ol-7,11-dione in 500 cc. of acetic acid was shaken at a temperature of 91° C. for 3 hours with 30 g. of zinc dust. The zinc was removed by filtration and the solution was poured into water. The precipitate was collected and washed with water until neutral. After one crystallization from chloroform-pentane, 2.5 g. was obtained of the acetate of 22a-spirostan-3α-ol-7,11-dione having a melting point of 184°–186° C. The infrared spectrum showed characteristic bands at 1736 and 1718 cm.$^{-1}$, indicating the presence of an acetyl and a saturated 7,11-diketone group. Conventional saponification produced the corresponding free 22a-spirostan-3α-ol-7,11-dione.

Example IV

A solution of 7.88 g. of the acetate of 22a-spirostan-3α-ol-7,11-dione in 100 cc. of acetic acid was mixed with 7.9 cc. of ethanedithiol and 4 cc. of a saturated solution of hydrogen bromide in acetic acid. The mixture was kept for four hours at room temperature, the precipitate was filtered and the filtrate was kept for a further 16 hours and then poured into water. The precipitate was extracted with ethyl acetate, washed with water, with sodium bicarbonate solution and water, dried over sodium sulfate and evaporated to dryness. The residue, together with the precipitate previously obtained, was crystallized from ether, thus giving 3.95 g. of the acetate of 22a-spirostan-3α-ol-11-one 7-cycloethylene mercaptal having a melting point of 285°–287° C., $[\alpha]_D$ −27° (chloroform). Besides the characteristic band of the acetyl group, the infrared spectrum showed a band at 1710 cm.$^{-1}$, indicating the presence of the 11-keto group.

Example V 3.8 g. of the product of Example IV was dissolved in 3 l. of ethanol previously distilled over Raney nickel and the solution was refluxed for six hours in the presence of 50 g. of Raney nickel. The nickel was removed by filtration and the filtrate was evaporated to dryness at low temperature under reduced pressure. The residue was dissolved in chloroform, washed to neutral and again evaporated to dryness. Recrystallization from ether afforded the acetate of 22a-spirostan-3α-ol-11-one with a melting point of 179°–181° C. This compound had essentially the same infrared bands as the compound obtained in accordance with Example III (1736 and 1714 cm.$^{-1}$); $[\alpha]_D$ +10° (chloroform). Conventional saponification gave the free 22a-spirostan-3α-ol-11-one.

Example VI 2.3 g. of the product of Example V was heated in a pressure bomb with 20 cc. of acetic anhydride for 8 hours at 175°–180° C. After cooling, the mixture was poured into water, extracted with ether, washed with water, dried over sodium sulfate and evaporated to dryness. The residual oil was dissolved in 40 cc. of acetic acid and 35 cc. of ethylene dichloride, cooled to 15° C. and treated dropwise under stirring with a solution of 1.1 g. of chromic acid in 2 cc. of water and 20 cc. of acetic acid. After two hours standing at room temperature, the mixture was diluted with water, extracted with chloroform, washed with water, dried and evaporated to dryness. The residue was chromatographed in a column with unwashed alumina, thus giving 250 mg. of the acetate of $\Delta^{16}$-pregnen-3α-ol-11,20-dione with a melting point of 205°–206° C. which could be conventionally saponified to the free compound. Catalytic hydrogenation of this compound (preferably the acetate) with 10% palladium on charcoal catalyst and ethyl acetate as solvent yielded the acetate of 11-keto-pregnanolone (pregnan-3α-ol-11,20-dione) having a melting point of 131°–134° C., $[\alpha]_D$ +129° (chloroform), which showed no depression in the melting point in mixture with an authentic sample.

Example VII 300 mg. of the acetate of $\Delta^{9(11)}$-22a-spirosten-3α-ol-7-one in 25 cc. of methanol was refluxed for one hour under an atmosphere of nitrogen with 300 mg. of potassium hydroxide. The mixture was poured into water and the precipitate was collected and washed to neutral. Crystallization from chloroform-methanol gave 270 mg. of $\Delta^8$-22a-spirosten-3α-ol-7-one with a melting point of 212°–214° C., $[\alpha]_D$ −77° (chloroform). The substance showed an ultraviolet absorption maximum at 254 mμ (log E 4.16).

Example VIII 400 mg. of the product of Example VII was dissolved in 16 cc. of benzene and 2 cc. of isopropenyl acetate and the mixture was refluxed for six hours maintaining a slow distillation through a fractionating column. At the end of three hours, one additional cc. of isopropenyl acetate was added, and two cc. more at the end of the fourth hour. The solution was evaporated to dryness and the residue was dissolved in ether, washed with sodium bicarbonate and water, dried over sodium sulfate and evaporated to dryness. Crystallization from acetone-pentane yielded the diacetate of $\Delta^{7,9(11)}$-22a-spirostadiene-3α,7-diol having a melting point of 172°–174° C. (Kofler 178°–180° C.), $[\alpha]_D$ +76° (chloroform), ultraviolet absorption maximum at 242 mμ (log E 4.35).

We claim:
1. A process for the preparation of a compound selected from the group consisting of 22a-spirostan-3α-ol-11-one lower fatty acid esters and the benzoic acid ester thereof which comprises treating the corresponding ester of $\Delta^{7,9(11)}$-22a-spirostadiene-3α-ol with sodium dichromate to produce the corresponding ester of $\Delta^8$-22a- spirosten-3α-ol-7,11-dione, treating the Δ⁸-ester with a reducing agent to produce the corresponding 22a-spirostan-3α-ol-7,11-dione ester, and thereafter selectively removing the 7-keto group from the 7,11-dione ester by forming the 7-thioketal thereof followed by Raney nickel desulfurization of the thioketal.

2. A process for the preparation of a compound selected from the group consisting of 22a-spirostan-3α-ol-11-one lower fatty acid esters and the benzoic acid ester thereof which comprises selectively removing the C-7 keto group of a compound selected from a group consisting of 22a-spirostan-3α-ol-7,11-dione and esters by forming the 7-thioketal thereof followed by Raney nickel desulfurization of the thioketal thereof.

3. A process for the preparation of the acetate of 22a-spirostan-3α-ol-11-one, which comprises selectively forming a 7-thioketal of the acetate of 22a-spirostan-3α-ol-7,11-dione and treating the thioketal with Raney nickel catalyst.

4. A new compound selected from the group consisting of 22a-spirostan-3α-ol-11-one lower fatty acid esters and the benzoic acid ester thereof.

5. The acetate of 22a-spirostan-3α-ol-11-one.

References Cited in the file of this patent

UNITED STATES PATENTS

| | | |
|---|---|---|
| Re. 23,008 | Wagner | June 15, 1948 |
| 2,352,850 | Marker | July 4, 1944 |
| 2,540,964 | Sarett | Feb. 6, 1951 |
| 2,541,104 | Sarett | Feb. 13, 1951 |

OTHER REFERENCES

Hauptman: J. A. Chem. Soc., pp. 562–566, March 1947, vol. 69.

Chamberlain: J. Amer. Chem. Soc., May 1951, pp. 2396–2397.

Stork: J. Amer. Chem. Soc., July 1951, pp. 3546–3547.